(12) United States Patent
Golbandi et al.

(10) Patent No.: US 12,353,472 B2
(45) Date of Patent: *Jul. 8, 2025

(54) GENERIC CARD FEATURE EXTRACTION BASED ON CARD RENDERING AS AN IMAGE

(71) Applicant: Yahoo Assets LLC, New York, NY (US)

(72) Inventors: Nadav Golbandi, New York, NY (US); Uri Schonfeld, San Jose, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,882

(22) Filed: Mar. 3, 2023

(65) Prior Publication Data

US 2023/0205811 A1 Jun. 29, 2023

Related U.S. Application Data

(63) Continuation of application No. 17/135,933, filed on Dec. 28, 2020, now Pat. No. 11,599,571, which is a continuation of application No. 16/393,836, filed on Apr. 24, 2019, now Pat. No. 10,878,023, which is a continuation of application No. 15/190,030, filed on Jun. 22, 2016, now Pat. No. 10,318,573.

(51) Int. Cl.
*G06F 16/532* (2019.01)
*G06F 16/58* (2019.01)
*G06F 16/9535* (2019.01)
*G06T 11/60* (2006.01)
*G06V 10/22* (2022.01)
*G06V 10/778* (2022.01)

(52) U.S. Cl.
CPC ............ *G06F 16/532* (2019.01); *G06F 16/58* (2019.01); *G06F 16/9535* (2019.01); *G06T 11/60* (2013.01); *G06V 10/235* (2022.01); *G06V 10/778* (2022.01)

(58) Field of Classification Search
CPC .... G06F 16/532; G06F 16/58; G06F 16/9535; G06T 11/60; G06V 10/235; G06V 10/778
See application file for complete search history.

(56) References Cited

U.S. PATENT DOCUMENTS 8,260,921 B2 * 9/2012 Uyama ............... H04L 41/5064
  705/7.29
10,142,400 B2 * 11/2018 Lara .......................... G06F 9/50
10,878,023 B2 * 12/2020 Golbandi ............ G06F 16/9535
(Continued)

*Primary Examiner* — John B Strege
(74) *Attorney, Agent, or Firm* — Cooper Legal Group LLC

(57) ABSTRACT

Methods and apparatus for using features of images representing content items to improve the presentation of the content items are disclosed. In one embodiment, a plurality of digital images are obtained, where each of the images represents a corresponding one of a plurality of content items Image features of each of the digital images are determined. Additional features including at least one of user features pertaining to a user of a client device or contextual features pertaining to the client device are ascertained. At least a portion of the content items are provided via a network to the client device using features that include or are derived from both the image features of each of the plurality of digital images and the additional features.

20 Claims, 5 Drawing Sheets

(56) References Cited

U.S. PATENT DOCUMENTS

| | | | |
|---|---|---|---|
| 11,056,238 B1* | 7/2021 | Nakajima | G16H 40/67 |
| 11,176,423 B2* | 11/2021 | Desai | G06F 18/2178 |
| 2001/0056415 A1* | 12/2001 | Zhu | G06F 16/5838 |
| 2010/0250336 A1* | 9/2010 | Selinger | G06Q 30/0643 |
| | | | 705/26.7 |
| 2010/0313141 A1* | 12/2010 | Yu | G06Q 30/02 |
| | | | 715/810 |
| 2014/0372423 A1* | 12/2014 | Majumder | G06F 16/9038 |
| | | | 707/725 |
| 2015/0154528 A1* | 6/2015 | Kharraz Tavakol | |
| | | | G06Q 10/063114 |
| | | | 705/2 |
| 2015/0254753 A1* | 9/2015 | Milewski | G06Q 30/0631 |
| | | | 705/26.7 |
| 2016/0342288 A1* | 11/2016 | Konik | G06Q 30/0643 |
| 2017/0308960 A1* | 10/2017 | Mascaro | G06Q 40/123 |

* cited by examiner

GENERIC CARD FEATURE EXTRACTION BASED ON CARD RENDERING AS AN IMAGE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

For example, this application claims priority to and is a continuation of U.S. application Ser. No. 17/135,933, filed on Dec. 28, 2020, entitled "GENERIC CARD FEATURE EXTRACTION BASED ON CARD RENDERING AS AN IMAGE", which claims priority to and is a continuation of U.S. application Ser. No. 16/393,836, filed on Apr. 24, 2019, entitled "GENERIC CARD FEATURE EXTRACTION BASED ON CARD RENDERING AS AN IMAGE", which claims priority to and is a continuation of U.S. application Ser. No. 15/190,030, filed on Jun. 22, 2016, entitled "GENERIC CARD FEATURE EXTRACTION BASED ON CARD RENDERING AS AN IMAGE". U.S. application Ser. No. 17/135,933, U.S. application Ser. No. 16/393, 836 and U.S. application Ser. No. 15/190,030 are incorporated by reference herein in their entirety.

BACKGROUND OF THE INVENTION

The present disclosure relates generally to computer implemented methods and apparatus for facilitating the ranking of the content items and the rendering of images representing content items.

Modern search engines and recommendation systems present different types of results such as videos, images, dictionary definitions, news articles, etc. Ranking algorithms typically rank the results using tags associated with the results. In addition, the ranking algorithms may personalize the results for a user to whom the results will be presented.

SUMMARY OF THE INVENTION

In one embodiment, a plurality of digital images are obtained, where each of the images represents a corresponding one of a plurality of content items. Image features of each of the digital images are determined. Additional features including at least one of user features pertaining to a user of a client device or contextual features pertaining to the client device are ascertained. At least a portion of the content items are provided via a network to the client device using features that include or are derived from both the image features of each of the plurality of digital images and the additional features.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
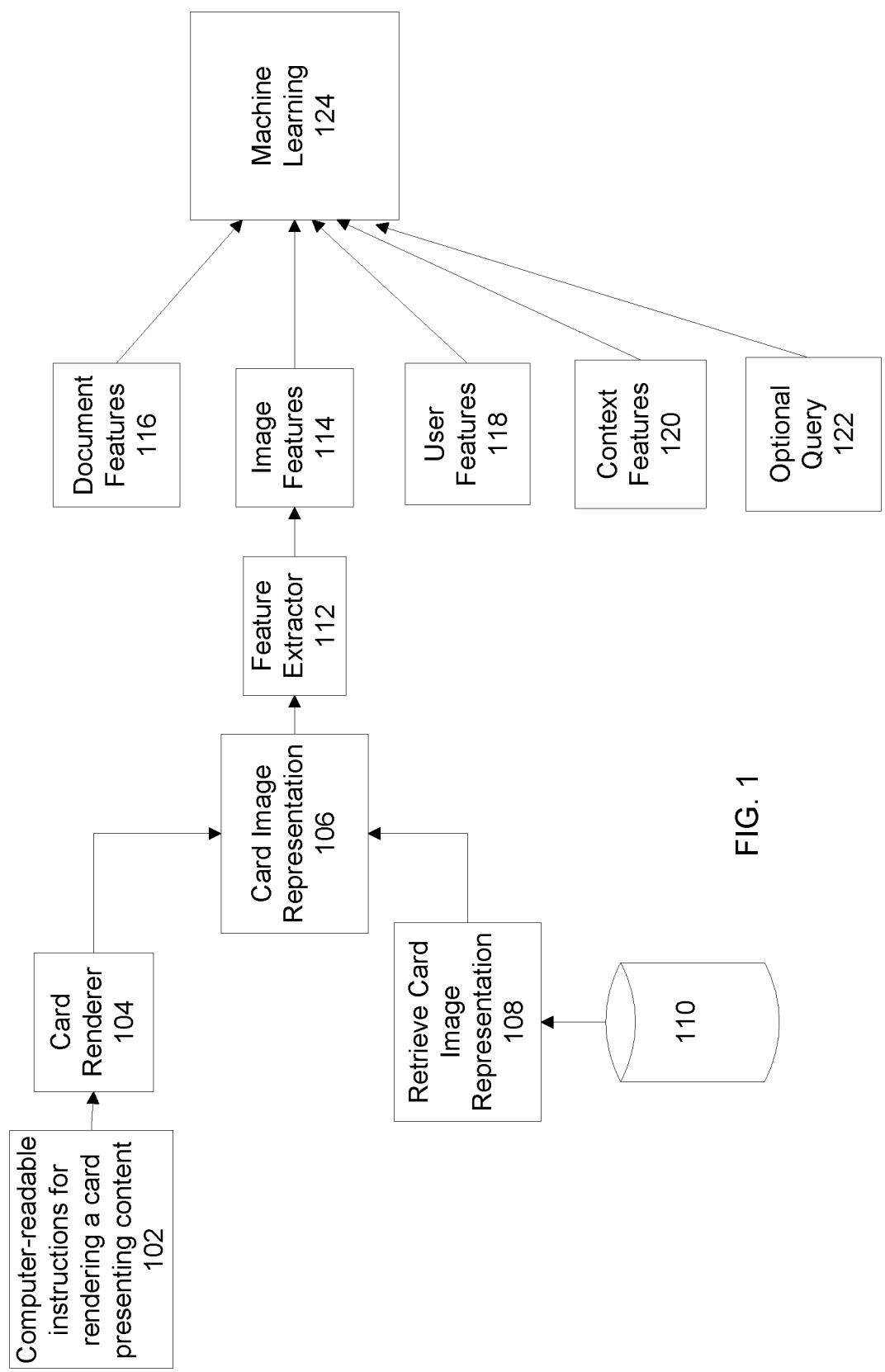
FIG. 1 is a block diagram illustrating an example system in which various embodiments may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

A search engine or recommendation system may provide various different types of content items as results to a client device. Often the results are presented as a list of content items including Uniform Resource Locators (URLs) that may be selected by a user. Example types of content items include, but are not limited to, videos, images, dictionary definitions, news articles, applications, etc. Each type of result may be presented to a client device according to a different format or layout. In other words, different layout features may be used to present each type of result to a client device. Generally, layout features are represented as metadata (e.g., annotations). For example, layout features may include the size of text, color of text, etc.

A ranking algorithm may make use of the layout features directly. However, many of the features that are visible to a user are not captured by the layout features. For example, while a user viewing search results on a dating web site may prefer men with moustaches, this type of information is not generally captured by a ranking algorithm. As a result, all of the features that are considered by a user viewing the results, either consciously or subconsciously, are not typically reflected in the results of the ranking algorithm.

Furthermore, the manner in which the results are presented may not be optimal for a given objective. For example, where a particular user is color blind, the results may not be presented so that they are most visible to the user. As another example, a particular result may not be displayed so as to best emphasize the features that are important to the user.

Typically, each result is displayed at the client device via execution by the client device of a set of computer-readable instructions for displaying a visual representation of the result. The visual representation of the result that is presented via a display may be referred to as a card. A card may also be referred to as a tile or user interface object. The card may encompass the entire screen of a display or a portion thereof. For example, a card may include text, image(s), graphics, and/or hypertext link(s). A card may correspond to a rectangular area within a particular segment of the display (e.g., within a particular row and column of a grid). While a card may include or represent an entire web page, a card may also present a specific category of content (e.g., according to corresponding layout features), which may correspond to a particular type of content item represented by the card.

In accordance with various embodiments, image features may be extracted from images representing content items or associated cards. The image features may be leveraged to improve machine learning algorithms such as ranking algorithms and display algorithms. In this manner, the presentation of content items may be personalized.

The disclosed embodiments may be particularly useful for selecting content items for recommendation to a user. For example, where a user is signed up for a dating web site, the web site may track user activity on the dating web site to learn the preferences of the user so that more appropriate matches may be presented to the user over time. Since features such as facial hair may be ascertained from images, the user's activity may indicate that they have a preference for matches having facial hair.

As another example, a content streaming web site may track user activity so that video recommendations may be personalized for a particular user or client device (e.g., where more than one user uses the client device). In addition, analysis of images representing video titles may yield valuable insights into the user's preferences. For example, analysis of images associated with video titles may indicate that a user tends to select video titles where an image representing the video titles include bright colors or female characters.

FIG. 1 is a block diagram illustrating an example system in which various embodiments may be implemented. As shown in this example, computer-readable instructions for rendering a card presenting content (e.g., a content item) may be obtained at 102 by a server. The card may include a visual representation that presents content. More particularly, a card may include a graphical user interface (GUI), which enables users to interact with their client device through graphical icons or other visual indicators. In some instances, the card may include a web page.

For example, the computer-readable instructions may include Hyper Text Markup Language (HTML) that describes a web document (i.e., web page). In addition, the computer-readable instructions may include Cascading Style Sheets (CSS) that describe the presentation of the web document. The computer-readable instructions may also include Java Script. The computer-readable instructions may include or reference images, text, or other resources.

A Card Renderer 104 may render the card to generate a digital image, which may be referred to as a Card Image Representation 106. Example image formats include, but are not limited to, JPG, BMP, TIF, PNG, and GIF. Where the image represents static content, the image may be stored in a database 110 for later retrieval, enabling the Card Image Representation 106 of a card to be later retrieved at 108 from the database 110 without re-rendering the card.

Once the Card Image Representation 106 is obtained, a Feature Extractor 112 may extract Image Features 114 from the image. Where the image represents static content (e.g., content that does not change over time and/or under different contexts), the image features or information derived from the image features may be stored in association with the card for later retrieval. The Image Features 114 and additional features may be provided to or obtained by a Machine Learning System 124. The additional features may include, but are not limited to, Document Features 116 associated with a content item, User Features 118 associated with a user to whom the card is to be presented, Context Features 120 pertaining to a context of a client device to which the card is to be presented or a current network session in which the card is to be presented, and/or an optional Query 122 that may have been submitted by the user.

Document features may include layout features such as a format of the card (e.g., placement of data fields within the card), title of the card, color of text presented within the card, and/or font of text presented within the card. In addition, the document features may pertain to the content item represented by the card. For example, the document features may indicate a length of the corresponding content item, amount of data in the content item, etc.

User features may include demographic features such as age, gender, and/or location. The user features may also indicate interests of the user, search/browsing history of the user, history of interactions with cards presented to the user, etc. The user features may be maintained in a user profile. An example user profile will be described in further detail below.

Context features may indicate a context of a client device to which the card is to be presented. For example, the context features may indicate a location of the client device, an amount of light detected by the client device, and/or capabilities of the client device (e.g., memory and/or processor). The context features may also indicate a context of a current network session in which the card is to be presented. For example, the context may indicate a connection speed and/or bandwidth.

The image features that are extracted may vary according to the machine learning algorithm of the Machine Learning System 124. Example image features include, but are not limited to, entity identification (e.g., people or buildings), geographic features (e.g., water, road, tree, mountain), faces, facial features, colors, text, and sub-images Image features may be detected via various applications that perform digital image processing techniques to analyze digital images. Such techniques may include, but are not limited to, pattern recognition, entity detection, or the detection of various features such as shapes, faces, facial features, gender, colors, brightness, etc.

The Image Features 114 and additional features may be applied by a Machine Learning Algorithm of the Machine Learning System 124 to generate or update a machine learning model (e.g., prediction model) of the Machine Learning System 124. More particularly, during "training time," the model may be generated using training data either offline or online. For example, the model may include a ranking algorithm or display algorithm. During "prediction time," a user may interact with a card that is displayed via a client device, for example, by clicking (or tapping) on the card. The model may be updated as a result of interaction (or lack thereof) by the user with the card.

During "prediction time" (e.g., online) the model may be applied to the Image Features 114 of one or images (e.g., Card Image Representations 106) and the additional features. For example, the model may rank the images or ascertain display features that may be used to display the images. In this manner, it is possible to personalize the ranking and choose specific display features (e.g., layouts) for specific users.

Figure 2:
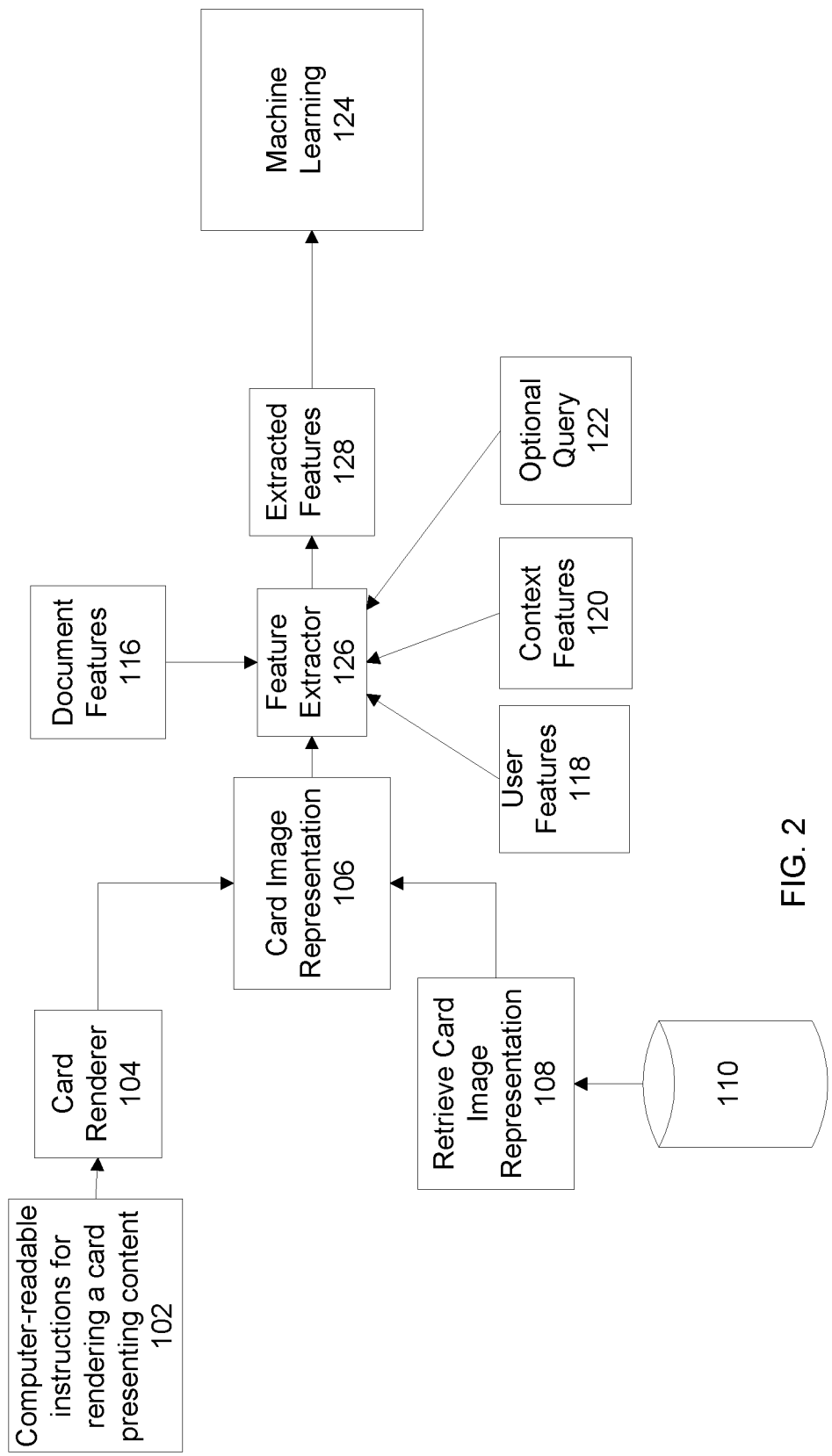
FIG. 2 is a block diagram illustrating another example system in which various embodiments may be implemented.

FIG. 2 is a block diagram illustrating another example system in which various embodiments may be implemented. In this example, rather than extracting image features from the Card Image Representation 106, a Feature Extractor 126 may extract features 128 based upon multiple inputs including the Card Image Representation 106 and additional features. The Feature Extractor 126 may analyze the multiple inputs in combination to ascertain image features, patterns (e.g., for a particular user or class of users), correlations among the inputs, and/or other information. The additional features may include, but are not limited to, the Document Features 116, User Features 118, Context Features 120, and/or an Optional Query 122.

The disclosed embodiments may be implemented via one or more servers and/or one or more client devices. An example system via which the disclosed embodiments may be implemented will be described in further detail below with reference to FIG. 3.

Figure 3:
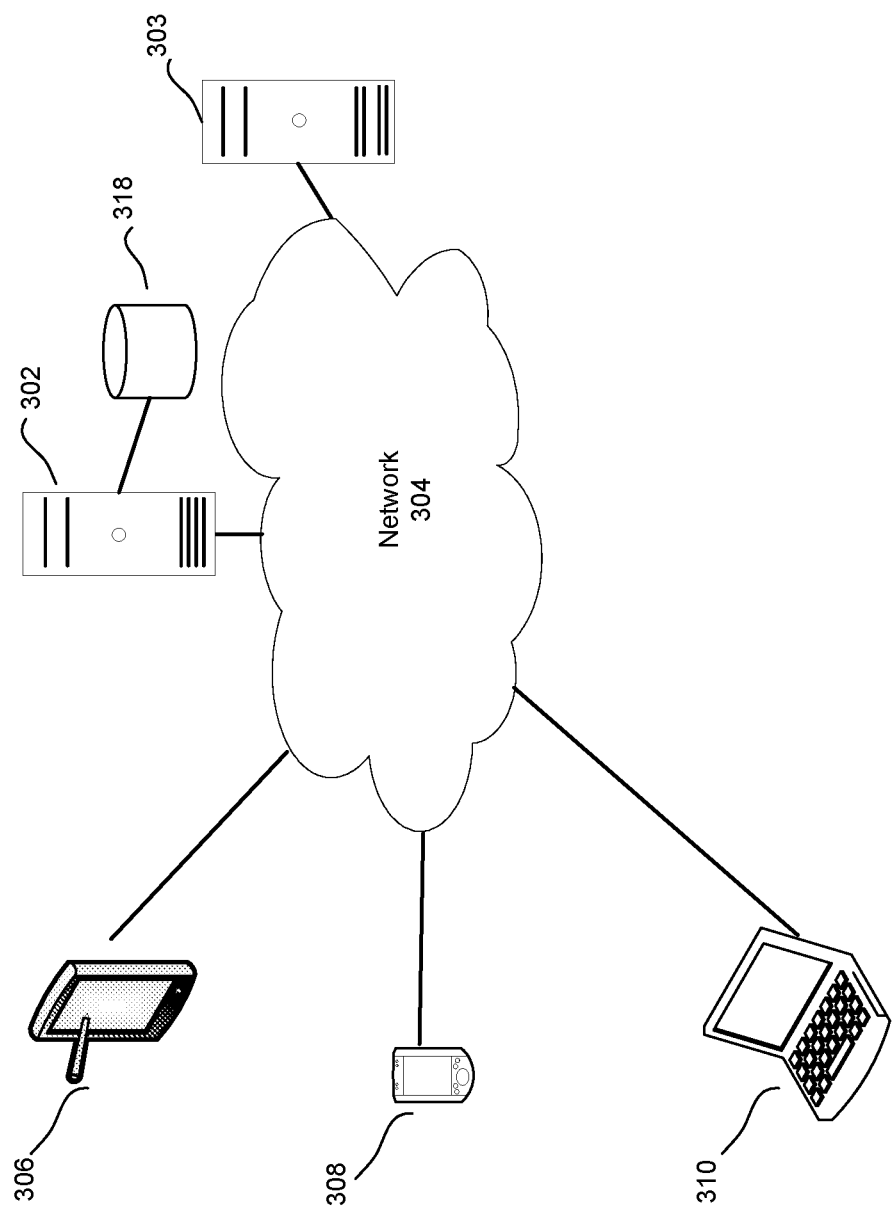
FIG. 3 is a diagram illustrating an example network in which various embodiments may be implemented.

FIG. 3 is a diagram illustrating an example system in which various embodiments may be implemented. The disclosed embodiments may be implemented in some centralized manner. This is represented in FIG. 3 by server(s) 302, which may correspond to multiple distributed devices and data store(s). The server(s) 302 and/or corresponding data store(s) may store user account data, user information such as user profiles, query logs, search logs, content, computer-readable instructions for rendering cards, images representing rendered cards, content, and/or additional data.

The server(s) 302 may be associated with a web site that provides a variety of services to its users. More particularly, the server(s) 302 may include a web server, electronic mail server, search server, and/or content server. As will be described in further detail below, the server(s) 302 may facilitate the extraction of features from cards based, at least in part, upon images representing the cards. The extracted features may be used to train a machine learning algorithm, which may be optimized for various tasks such as ranking of content items or associated cards, optimal presentation of content items or associated cards via a display, or other operations.

Embodiments disclosed herein may be implemented via the server(s) 302 and/or the clients 306, 308, 310. For example, various features may be implemented via an application installed on the clients 306, 308, 310. The application may operate independently to identify and present at least one card via the client. Alternatively, the server(s) 302 may communicate with the application on the clients 306, 308, 310 via a network 304. In some embodiments, the application may be integrated with a homescreen application of a mobile device. The disclosed embodiments may be implemented via software and/or hardware.

The disclosed embodiments may be implemented on any number of servers although only a single server 302 is illustrated for clarity. The client devices 306, 308, 310 may be implemented, for example, via any type of computer (e.g., desktop, laptop, tablet, etc.), media computing platforms (e.g., cable and satellite set top boxes and digital video records), handheld computing devices (e.g., PDAs), cell phones, or any other type of computing or communication platform.

The disclosed embodiments may be practiced in a wide variety of network environments (represented by network 304) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The network 304 may take any suitable form, such as a wide area network or Internet and/or one or more local area networks (LAN's). The network 304 may include any suitable number and type of devices, e.g., routers and switches, for forwarding search or web object requests from each client to the search or web application and search or web results back to the requesting clients.

The server(s) 302 may facilitate the transmission of content items or associated cards to a client device of a user based, at least in part, on information maintained in a user profile of the user. More particularly, the server(s) 302 may transmit computer-readable instructions for rendering one or more cards or a list of the cards to the application of one of the clients 306, 308, 310 via the network 304. In addition, the server(s) 302 may generate and transmit a ranking associated with the cards to the client. The receiving client may render at least a portion of the cards via an associated display.

When a card is rendered at a client device, the client device may render the card such that is presented via a display of the client device. In addition, a corresponding data object may be generated or updated to maintain state information. The state information associated with a card may be saved or updated, for example, after a period of inactivity of the client device or a shutdown of the client device.

The state information of a card may include various types of information. For example, the state information may indicate whether the user interacted with the card and/or a priority (e.g., ranking) of the card in relation to other cards.

In accordance with various embodiments, user features may be identified based, at least in part, on information retained in a user profile. The server 302 (or servers) may have access to a plurality of user profiles of users. Each profile may be associated with a corresponding user represented by a user account identifier, browser identifier, and/or client device identifier.

A user profile may be associated with one or more client devices. Conversely, each client device may be associated with a set of one or more users, enabling user profile(s) associated with the client device to be identified. Therefore, the continuity of experience of a user may be facilitated across multiple client devices of the user.

In accordance with various embodiments, the server(s) 302 may have access to one or more user logs 318 (e.g., user databases) into which user information is retained for each of a plurality of users. This user information or a portion thereof may be referred to as a user profile. More particularly, the user profile may include public information that is available in a public profile and/or private information. The user logs 318 may be retained in one or more memories that are coupled to the server 302.

Similarly, the client devices 306, 308, 310 may maintain a local copy of a user profile or portion thereof. Moreover, a client device may have access to additional information that the server(s) 302 do not. Therefore, a client device may maintain a user profile that is different from that maintained by the server(s) 302.

The user information retained in a user profile may indicate a plurality of features for a corresponding user. More particularly, the features may include personal information such as demographic information (e.g., age, marital status, and/or gender) and/or geographic information (e.g., residence address and/or work address). In addition, the features may indicate types of content consumed by the user and/or interests of the user.

In some instances, the geographic information maintained in a user profile may indicate the current location of a user. The current location of a user may be identified based upon signals explicitly transmitted by the user or implicit signals. Examples of implicit signals include an Internet Protocol (IP) address or Global Positioning System (GPS) location of a client device, which may be used to infer a location of the user. As another example, the user's location may be implied through cell tower triangulation. In addition, a user may explicitly check in to a location via the use of a check in application, which may be accessed via a website and/or installed on a client device such as a mobile device.

In accordance with various embodiments, the user profile may include information pertaining to cards that have been displayed to the user. In addition, the user profile may indicate whether the user has interacted with the cards.

In some embodiments, a particular algorithm may be optimized to train a prediction model. Therefore, the user profile may include parameter values associated with the prediction model.

In addition, each time a user performs online activities such as clicking on a card (e.g., GUI or web page), clicking on an advertisement, or purchasing goods or services, information regarding such activity or activities may be retained as user data in the user profile. For example, the user profile may indicate the identity of web sites visited, identity of cards or ads that have been selected (e.g., clicked on), and/or a timestamp. In addition, the features may indicate a purchase history with respect to one or more products, one or more types of products, one or more services, and/or one or more types of services.

The user logs 318 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

A variety of mechanisms may be implemented to support the generation or updating of user profiles including, but not limited to, collecting or mining navigation history, stored documents, tags, messages, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

To facilitate the presentation of cards to a user, the data associated with one or more user profiles may be analyzed. More particularly, a machine learning algorithm may be trained and optimized to generate and update a machine learning model. The machine learning model may operate as a prediction model to predict the preferences of a particular user or class of users. Example methods of presenting cards to a user will be described in further detail below.

In the following example, the disclosed embodiments are implemented at server(s) within a network. However, this example is merely illustrative, and the disclosed embodiments may also be implemented at a client device.

Figure 4:
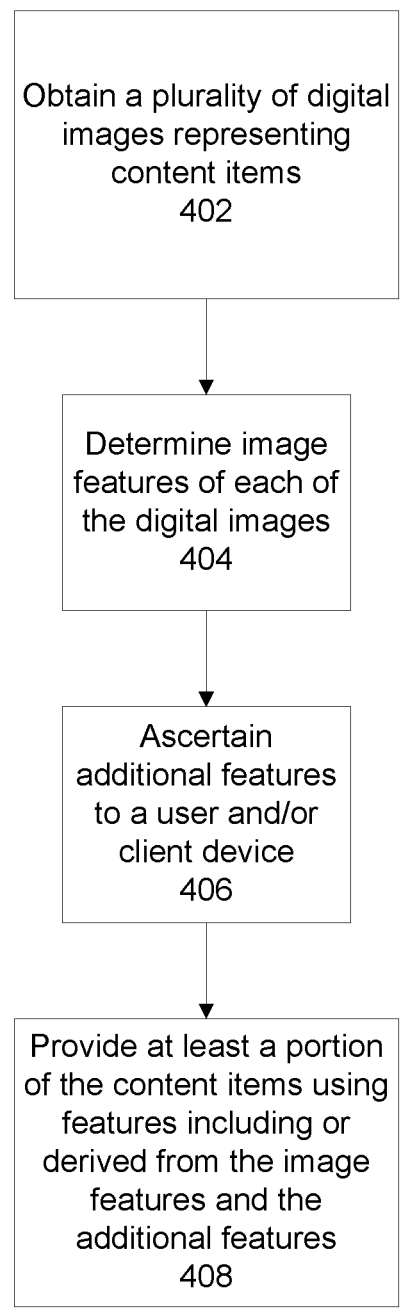
FIG. 4 is a process flow diagram illustrating an example method of performing feature extraction and application based upon card rendering as an image in accordance with various embodiments.

FIG. 4 is a process flow diagram illustrating an example method of performing feature extraction and application based upon card rendering as an image in accordance with various embodiments. Once a machine learning model has been trained, the model may be applied.

The model may be applied automatically (e.g., periodically) to identify a plurality of content items that may be of interest to a user. For example, the content items may include web pages. Alternatively, the model may be applied in response to a request message received from a client device. For example, when a user browses to a particular web page, interacts with an item within the web page (e.g., by clicking on a hypertext link), or submits a search query, the client device may transmit a request to a server via a network. The request may include, for example, search terms of the search query, an identifier of a web page, tags associated with a web page, and/or an identifier of the client device.

One or more servers may identify a list of content items or associated cards that are pertinent to the request received from the client device or the user. More particularly, the servers may select and retrieve the content items from content maintained in one or more databases. For example, the content items may be identified by Uniform Resource Locators (URLs).

A plurality of digital images may be obtained by one or more servers at 402, where each of the plurality of digital images represents a corresponding one of the content items. A digital image may be obtained by generating the digital image from a card or retrieving the digital image associated with a card from a database.

Image features of the digital images may be determined by one or more servers at 404. More particularly, the image features may be extracted from each of the digital images. Alternatively, where the image features have previously been determined and stored for a "static" card, the image features may be retrieved from a database.

Additional features may be ascertained by one or more servers at 406. In accordance with various embodiments, the additional features may include user features pertaining to a user of a client device, contextual features pertaining to the client device, document features associated with a corresponding web document (e.g., web page), and/or further features derived from terms of a user query.

At least a portion of the content items may be provided at 408 by one or more servers via a network to the client device using features including or derived from both the image features of the digital images and the additional features. For example, a computer-generated model may be applied, as described herein. More particularly, the content items may be ranked using the computer-generated model based, at least in part, on the corresponding image features and the additional images, where the portion of the content items are provided based, at least in part, on the ranking. In addition, display features to be used for presenting digital image(s) associated with at least one of the content items may be ascertained using the computer-generated model based, at least in part, on the corresponding image features and the additional features. In this manner, the presentation of content items may be personalized for a particular user.

Display features may include a layout or layout features of a card. For example, the display features may indicate a desired color scheme and/or a desired format. In addition, the display features may indicate whether multiple cards are to be combined, as well a particular configuration in which multiple cards are to be presented via a display (e.g., where multiple cards are to be displayed simultaneously). For example, a homescreen of a mobile device may display multiple cards according to a grid.

In some embodiments, an icon may represent a single card or a collection of cards. A collection of cards may also be referred to as a "stack" of cards. To view a card or "stack" of cards, the user may click on the icon, which may produce a larger, "full-size" version of a card (e.g., the card at the top of the stack).

In accordance with various embodiments, a mobile application enables a stream of cards to be presented via a display of the mobile device. A user may scroll within the stream of cards to view individual cards within the stream.

The user may interact with a card in a number of different ways. More particularly, the user may click on the card to view a larger version of the card, to launch an application represented by the card, or access content of the card. In addition, the user may interact with the content of the card. In some instances, the content of the card may include a Uniform Resource Locator (URL) or hypertext link that the user may click on to access a corresponding web page.

User interaction with a card or lack thereof may be recorded in the user profile. A prediction model may be updated based, at least in part, on the user interaction or lack thereof. The prediction model may be used to identify cards, as described herein.

Network Environment

Implementations are contemplated in which users interact with a diverse network environment. For example, the network environment may include a variety of networks.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

User interface objects and any corresponding content may be identified, generated, and/or retrieved via a content distribution network. A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

User interface objects may also be identified and presented in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

In some embodiments, the network environment may include a wireless network that couples client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Various embodiments may be employed via one or more servers. A computing device that is capable of sending or receiving signals, such as via a wired or wireless network, or capable of processing or storing signals, such as in memory as physical memory states, may operate as a server. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content items or cards may be identified or provided via a content server. A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wilds, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 5:
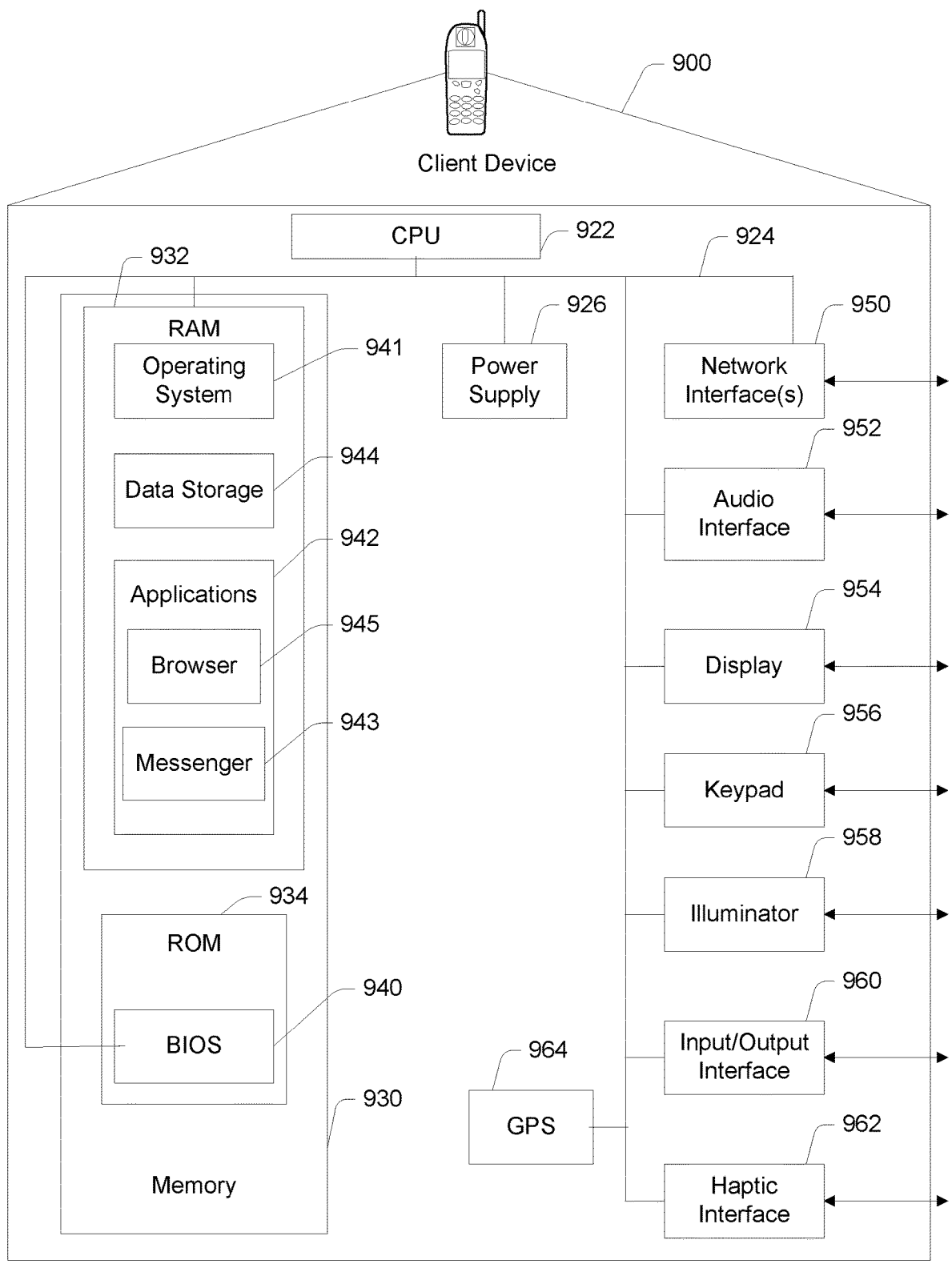
FIG. 5 is a diagram illustrating an example client device in which various embodiments may be implemented.

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Regardless of the system's configuration, it may employ one or more memories or memory modules configured to store data, program instructions for the general-purpose processing operations and/or the inventive techniques described herein. For example, the program instructions may control the operation of one or more applications. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    providing a content item for presentation via a client device associated with a user;
    providing a second content item for presentation via at least one of the client device or a second client device associated with the user;
    responsive to processing an indication of user interaction with the content item and a second indication of user interaction with the second content item, applying, as training data to a computer-generated model, (i) context features of the client device by which the indication of user interaction was generated and (ii) a feature of both the content item and the second content item;
    providing, for presentation via at least one of the client device or the second client device, a third content item using the computer-generated model; and
    responsive to processing an indication associated with the third content item, updating the computer-generated model based, at least in part, on one or more features of the third content item.

2. The method of claim 1, further comprising:
  determining one or more features of each one of a plurality of content items;
  wherein providing the third content item comprises:
    selecting at least a portion of the plurality of content items using the computer-generated model based, at least in part, on the one or more features of each of the plurality of content items; and
    providing, for presentation via the client device or the second client device, the portion of the plurality of content items.

3. The method of claim 1, further comprising:
  selecting, using the computer-generated model, display features for one or more content items; and
  providing the one or more content items according to the display features.

4. The method of claim 1, further comprising:
  after the updating the computer-generated model, providing a fourth content item for presentation via at least one of the client device or the second client device associated with the user using the computer-generated model.

5. The method of claim 1, further comprising:
  generating a digital image representing the content item, at least in part, by rendering the content item.

6. The method of claim 1, further comprising:
  determining image features of the content item, at least in part, using digital image processing.

7. The method of claim 1, the computer-generated model associated with at least one of the user or a class of users including the user.

8. An apparatus, comprising:
  a processor; and
  a memory, at least one of the processor or the memory being configured to:
    provide a content item for presentation via at least one of a client device or a second client device;
    responsive to processing an indication of a lack of user interaction with the content item, apply, as training data to a computer-generated model, (i) context features of at least one of the client device or the second client device by which the indication of a lack of user interaction was generated and (ii) one or more image features associated with the content item; and
    provide, for presentation via at least one of the client device or the second client device, one or more content items using the computer-generated model.

9. The apparatus of claim 8, at least one of the processor or the memory being further configured to:
  determine one or more features of each one of a plurality of content items;
  select at least a portion of the plurality of content items using the computer-generated model based, at least in part, on the one or more features of each of the plurality of content items; and
  provide, for presentation via the client device or the second client device, the portion of the plurality of content items.

10. The apparatus of claim 8, wherein providing the one or more content items using the computer-generated model comprises:
  selecting, using the computer-generated model, display features for a second content item of the one or more content items; and
  providing the second content item according to the display features.

11. The apparatus of claim 8, the computer-generated model being associated with a user associated with at least one of the client device or the second client device.

12. The apparatus of claim 8, at least one of the processor or the memory being further configured to:
  generate a digital image representing the content item, at least in part, by rendering the content item.

13. The apparatus of claim 8, at least one of the processor or the memory being further configured to:
  determine image features of the content item, at least in part, using digital image processing.

14. The apparatus of claim 8, the computer-generated model being associated with a class of users including (i) a user associated with at least one of the client device or the second client device and (ii) one or more other users.

15. A computer program product comprising one or more non-transitory computer-readable media having computer program instructions stored therein, the computer program instructions being configured such that, when executed by one or more computing devices, the computer program instructions cause the one or more computing devices to:
  provide a content item for presentation via a client device associated with a user;
  responsive to processing an indication of user interaction with the content item, apply, as training data to a computer-generated model, (i) context features of the client device by which the indication of user interaction was generated and (ii) one or more features of the content item;
  provide a second content item for presentation via at least one of the client device or a second client device associated with the user;
  responsive to processing an indication of a lack of user interaction with the second content item, apply, to the computer-generated model, (i) context features of at least one of the client device or the second client device by which the indication of a lack of user interaction was generated and (ii) one or more features of the second content item; and
  provide, for presentation via at least one of the client device or the second client device, one or more content items using the computer-generated model.

16. The computer program product of claim 15, the computer program instructions being further configured to:
  determine one or more features of each one of a plurality of content items;
  select at least a portion of the plurality of content items using the computer-generated model based, at least in part, on the one or more features of each of the plurality of content items; and
  provide, for presentation via the client device or the second client device, the portion of the plurality of content items.

17. The computer program product of claim 15, the computer program instructions being further configured to:
  select, using the computer-generated model, display features for the one or more content items; and
  providing the one or more content items according to the display features.

18. The computer program product of claim 15, the computer-generated model associated with at least one of the user or a class of users including the user.

19. The computer program product of claim 15, the computer program instructions being further configured to:
  generate a digital image representing the content item, at least in part, by rendering the content item.

20. The computer program product of claim 15, the computer program instructions being further configured to: determine image features of the content item, at least in part, using digital image processing.

\* \* \* \* \*